Patented May 1, 1951

2,551,392

UNITED STATES PATENT OFFICE 2,551,392

DERIVATIVES OF BEHENIC ACID AMIDE

Josef Pikl, Glassboro, N. J., assignor to E. I. du Pont de Nemours & Company, Wilmington, Del., a corporation of Delaware No Drawing. Original application June 3, 1942, Serial No. 445,675. Divided and this application June 26, 1947, Serial No. 757,336

2 Claims. (Cl. 260—404.5)

This application is a division of my copending application Serial No. 445,675, filed June 3, 1942, (which matured into Patent No. 2,426,790). The invention herein relates to the production of novel derivatives of behenic acid amide and other higher fatty acid amides.

It is an object of this invention to produce novel derivatives of behenic acid amide or other higher fatty acid amides possessing valuable properties as agents for producing water-repellent effects upon textile fiber or which may serve as useful intermediates for the production of such agents. Other and further important objects of this invention will appear as the description proceeds.

In my parent application above identified, I have described and claimed a process for converting behenic acid amide into a reaction product possessing CH2Cl groups attached to nitrogen atoms. I have further shown there that the Cl atoms in such compounds are readily exchanged for thiocyano radicals, forming thiocyano intermediates which may be further converted into corresponding quaternary-ammonium thiocyanates. My present application is concerned primarily with these thiocyano compounds, both intermediates and quaternary compounds.

The complete process according to my invention comprises as a first step the reaction of behenic acid amide with formaldehyde-yielding agents and hydrogen chloride under conditions which will avoid the formation of substantial quantities of methylene-dibehenamide. I achieve this object by modifying the steps of procedure in such a manner as to avoid any high concentrations of behenic acid amide in the presence of the formaldehyde-yielding agent. Two procedures are possible for this purpose. Assuming that the reaction is carried out in a liquid medium such as benzene as in the other processes of the art, I may suspend the requisite quantity of paraformaldehyde or trioxymethylene in the benzene and then pass into it gradually from different sources of supply hydrogen chloride on the one hand and behenic acid amide on the other hand. Alternatively, I may pass all three reagents from different sources of supply into a vessel containing benzene. Or again, the formaldehyde and the behenic acid amide may be mixed together dry and passed gradually into a vessel containing benzene while simultaneously passing hydrogen chloride from another source into the vessel. It will be noted that in the last-mentioned case, although the paraformaldehyde is in constant contact with the behenic acid amide, the fact that the mixture is dry and is out of contact with hydrogen chloride prevents the formation of the undesirable bis-compound.

By proceeding in the above manner I have succeeded in obtaining compounds which according to their analyses contain between one and two behenamido chains per CH2Cl group. Without limiting my invention to any particular theory, I venture the hypothesis that the product probably consists principally of a bis-chloromethylene - dimethylene - tribehenamido compound as represented by the following formula:

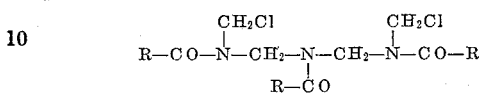

wherein R designates the radical $C_{21}H_{43}$.

Other possible components of the mixture are the corresponding methylene-bis-amido compounds and a trimethylene-tetrakisamido compound of the probable formula:

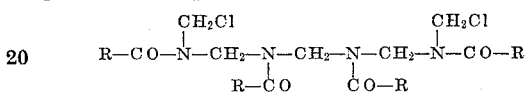

In all probability, all of these components are present in the products of my invention, the exact proportions of these in each case depending on the temperature, duration and other specific conditions of the reaction.

The above three different products are related in structure, and the more complex compounds may be brought together under the general formula:

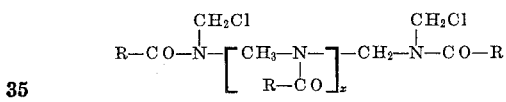

wherein $x$ stands for 1 or 2.

The above intermediate products are very reactive and may be reacted with potassium-thiocyanate or lead-thiocyanate according to my U. S. Patent No. 2,331,276, whereby to replace the chlorine atoms by thiocyano radicals, SCN. These in turn may be reacted with pyridine or other tertiary amines to produce the corresponding quaternary-ammonium - thiocyanates, analogous to the compounds described and claimed in my U. S. Patent No. 2,402,526.

On the other hand, if allowed to stand for some time without reacting with pyridine or other tertiary amines, the said thiocyanates undergo isomerization to give the corresponding isothiocyanates which may be applied to fabric from organic solution according to my said U. S. Patent No. 2,331,276, but again give water-repellency effects on fiber which are outstanding in their high initial power and fastness qualities.

If, in the above series of reactions, hydrogen bromide is employed in lieu of hydrogen chloride the corresponding methylene-bromide derivative may be obtained.

Without limiting my invention the following examples are given to illustrate my preferred mode of operation. The parts mentioned are by weight.

EXAMPLE I

*Part A.—Preparation of the chloromethylamide compound*

Eighty-five parts of behenic-acid amide (M. P. 114° C.) were dissolved in 500 parts of hot benzene and the solution then gradually added to a suspension of 15 parts of paraformaldehyde in 200 parts of benzene heated to 80° C. while a stream of hydrogen chloride was passed into the reaction mixture. The reaction flask was connected through a water separator to a reflux condenser and provided with an agitator. In forty-five minutes the addition of the behenic-acid amide solution was complete, giving a clear reaction mixture. The solution was heated for another half hour to insure complete reaction and then evaporated in vacuo on the steam bath. The resulting chloromethylamide was a low melting wax which decomposed with water.

*Part B.—Conversion into thiocyanate compounds*

Eighty-five parts of the chloromethylamide obtained according to Part A were dissolved in 500 parts of carbon tetrachloride and then reacted with 80 parts of lead thiocyanate at 80° C. After the reaction was complete the solution was filtered from the inorganic salts, and the product, a tan colored low melting wax, was recovered from the solvent by evaporation. It was readily soluble in benzene and in carbon tetrachloride, and gave with pyridine a water-soluble quaternary ammonium salt. It analyzed as follows:

Nitrogen: 5.85%; sulfur: 5.57%

The above analysis agrees closely with the empirical formula $C_{72}H_{137}O_3N_5S_2$, which would be required if the compound is a bis-(thiocyanomethylene)-dimethylene-tribehenamide as hypothesized in the general discussion above.

When this product was applied to cotton or wool from an organic solvent at a concentration of .5%, and the latter then subjected to baking, in standard manner, i. e., at a temperature between 105 and 150° C., it gave a strongly water-repellent fabric, the properties of which were not impaired by washing in a boiling soap solution or by extraction with a warm dry-cleaning solvent. When tested according to the standard method for testing water-repellency (Am. Dyest. Reporter, vol. 31, p. 8), this fabric was found to be remarkably superior as regards "permanence" (i. e., fastness to laundering and dry-cleaning), to a fabric similarly treated with the thiocyanate obtained in analogous manner from stearic-acid amide.

EXAMPLE II

*Part A.—Preparation of chloromethylamide compound*

One hundred thirteen parts of behenamide were dissolved in 500 parts of benzene and then added to a suspension of 20 parts of paraformaldehyde in 200 parts of benzene while passing in a stream of hydrogen chloride at the boiling point of the reaction mixture. In one hour all the amide had been added, and the heating of the clear solution was continued for another hour. The solvent was evaporated and a hard, waxy mass obtained as a residue. It contained 5.25% of chlorine. This is equivalent to about two fatty-acid-amides for each chlorine atom.

The above product reacted readily with triethylamine and pyridine to give water-soluble products which foamed strongly in warm water and which gave excellent water repellency when applied to cotton or regenerated cellulose from aqueous solution, followed by drying and heating in standard manner.

*Part B.—Conversion into thiocyanate*

Sixty parts of the chloromethylamide obtained in Part A were dissolved in 500 parts of carbon tetrachloride and reacted at 80° C. for one hour with 60 parts of lead thiocyanate. The inorganic salts were filtered off and a clear, light straw-colored solution was obtained. On evaporation of the solvent, the product analyzed at 5.46% nitrogen and 4.33% sulfur, which is about equivalent to two long-chain amido radicals for each sulfur atom.

This product gave excellent water repellency when applied, in standard manner, to cotton, wool or rayon.

Although the above discussion and examples have been limited particularly to behenic acid amide, in view of the difficulty of converting this amide into a chloro-methylene compound by the older processes of the art, my invention is nevertheless of a generic nature and may be applied also to such amides which encounter no special difficulties by the old processes. Thus they may be applied to stearamide, lauramide, montanic-acid amide, and in general to any amide of the formula R—CO—NH₂, wherein R is an alkyl or cyclo-alkyl radical of at least nine carbon atoms.

It will be understood that many other variations and modifications are possible in the procedures above outlined without departing from the spirit of this invention.

I claim as my invention:

1. A compound of the general formula

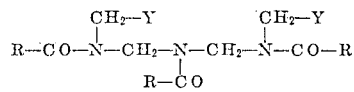

wherein R designates the radical $C_{21}H_{43}$, while Y designates a radical selected from the group consisting of thiocyanate and isothiocyanate.

2. A compound of the general formula

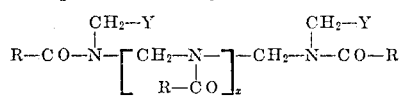

wherein Y designates a radical selected from the group consisting of thiocyanate and isothiocyanate, while $x$ stands for a numeral of the group consisting of 1 and 2, said compound being characterized by its capacity to react with tertiary nitrogenous bases to produce a water-soluble quaternary compound.

JOSEF PIKL.

REFERENCES CITED

The following references are of record in the file of this patent:

UNITED STATES PATENTS

| Number | Name | Date |
|---|---|---|
| 2,331,276 | Pikl | Oct. 5, 1943 |
| 2,402,526 | Pikl | June 25, 1946 |
| 2,426,790 | Pikl | Sept. 2, 1947 |

FOREIGN PATENTS

| Number | Country | Date |
|---|---|---|
| 471,130 | Great Britain | Aug. 27, 1939 |